United States Patent
Vecera et al.

(10) Patent No.: US 10,585,785 B2
(45) Date of Patent: Mar. 10, 2020

(54) PRESERVATION OF MODIFICATIONS AFTER OVERLAY REMOVAL FROM A CONTAINER

(71) Applicant: Red Hat, Inc., Raleigh, NC (US)

(72) Inventors: Martin Vecera, Brno (CZ); Jiri Pechanec, Mokra-Horakov (CZ)

(73) Assignee: Red Hat, Inc., Raleigh, NC (US)

(*) Notice: Subject to any disclaimer, the term of this patent is extended or adjusted under 35 U.S.C. 154(b) by 0 days.

(21) Appl. No.: 16/252,050

(22) Filed: Jan. 18, 2019

(65) Prior Publication Data
US 2019/0155718 A1 May 23, 2019

Related U.S. Application Data

(63) Continuation of application No. 15/163,343, filed on May 24, 2016, now Pat. No. 10,185,648.

(51) Int. Cl.
- *G06F 9/44* (2018.01)
- *G06F 11/36* (2006.01)
- *G06F 16/11* (2019.01)
- *G06F 16/51* (2019.01)

(52) U.S. Cl.
CPC ........ *G06F 11/3668* (2013.01); *G06F 16/128* (2019.01); *G06F 16/51* (2019.01)

(58) Field of Classification Search
None
See application file for complete search history.

(56) References Cited

U.S. PATENT DOCUMENTS

| | | | |
|---|---|---|---|
| 8,464,241 B2 | 6/2013 | Hayton | |
| 8,539,073 B1 | 9/2013 | Dayan | |
| 8,904,081 B1* | 12/2014 | Kulkarni | G06F 9/452 711/6 |

FOREIGN PATENT DOCUMENTS

| | | |
|---|---|---|
| CN | 105160269 A | 12/2015 |
| CN | 105357296 A | 2/2016 |
| WO | WO2015171030 A1 | 11/2015 |

OTHER PUBLICATIONS

"How to Debug a Docker Container;" 2015, 8 pages, retrieved from http://pothibo.com/2015/7/how-to-debug-a-docker-container on May 25, 2016.

Mark Betz; Ten Tips for Debugging Docker Containers; Mar. 23, 2016; 9 pages, retrieved from https://medium.com/@betz.mark/ten-tips-for-debugging-docker-containers-cde4da841a1d#.83zrr0w2n; on May 25, 2016.

(Continued)

*Primary Examiner* — Qamrun Nahar
(74) *Attorney, Agent, or Firm* — Haynes and Boone, LLP (57) ABSTRACT

An example method of preserving a modification to an internal state of a computer system includes applying an overlay on a target container. The overlay includes a set of events corresponding to a first set of modifications to a computer system. The method also includes after applying the overlay, receiving a set of user requests corresponding to a second set of modifications to the computer system. The method further includes changing, based on the set of user requests, the third set of internal states of the computer system to the fourth set of internal states. The method also includes removing the overlay from the target container, while preserving the second set of modifications to the computer system.

20 Claims, 6 Drawing Sheets

(56) References Cited

OTHER PUBLICATIONS

"Docker Command Line"; 34 pages, retrieved from https://docs.docker.com/v1.6/reference/commandline/cli/; on May 25, 2016.
Shab, Docker with OverlayFS First Impressions; Mar. 30, 2015, 8 pages, Developer at Cloud 66; retrieved from https://docs.docker.com/v1.6/reference/commandline/cli/; on May 25, 2016.

* cited by examiner

PRESERVATION OF MODIFICATIONS AFTER OVERLAY REMOVAL FROM A CONTAINER

CROSS REFERENCE TO RELATED APPLICATION

The present application is a continuation of U.S. patent application Ser. No. 15/163,343, filed on May 24, 2016, which is hereby incorporated by reference in its entirety.

BACKGROUND

The present disclosure generally relates to computing devices, and more particularly to preservation of modifications after an overlay is removed from a container.

Platforms exist for developing, shipping, and running applications. For example, a platform may allow developers to separate their applications from the infrastructure and treat the infrastructure like a managed application. The platform may help a developer ship software code faster, test faster, deploy faster, and shorten the cycle between writing and running the code. The platform may combine kernel containerization features with workflows and tooling that help the developer manage and deploy applications. The platform may provide a way to run an application securely isolated in a container. The isolation and security allow the developer to run many containers simultaneously on a host machine. The lightweight nature of containers, which run without the extra load of a hypervisor, may result in better use of hardware.

Surrounding the container are tool(s) and a platform that can help the developer place applications (and supporting components) into containers, distribute and ship those containers to others for further development and testing, and deploy those applications to the production environment, whether it is in a local data center or the cloud.

BRIEF SUMMARY

Methods, systems, and techniques for preserving one or more modifications to an internal state of a computer system are provided.

An example method of preserving one or more modifications to an internal state of a computer system includes applying an overlay on a target container. The overlay includes a set of events corresponding to a first set of modifications to a computer system. The first set of modifications includes changing a first set of internal states of the computer system to a second set of internal states. The method also includes after applying the overlay, receiving a set of user requests corresponding to a second set of modifications to the computer system. The second set of modifications includes changing a third set of internal states of the computer system to a fourth set of internal states. The method further includes changing, based on the set of user requests, the third set of internal states of the computer system to the fourth set of internal states. The method also includes removing the overlay from the target container, while preserving the fourth set of internal states of the computer system.

An example system for preserving one or more modifications to an internal state of a computer system includes an overlay module that applies an overlay on a target container. The overlay includes a set of events corresponding to a first set of modifications to a computer system. The first set of modifications includes changing a first set of internal states of the computer system to a second set of internal states. The system also includes a user interface that receives a set of user requests corresponding to a second set of modifications to the computer system after the overlay is applied to the target container. The second set of modifications includes changing a third set of internal states of the computer system to a fourth set of internal states. The system further includes a modification module that changes, based on the set of user requests, the third set of internal states of the computer system to the fourth set of internal states. The system also includes a preservation module that removes the overlay from the target container, while preserving the fourth set of internal states of the computer system.

An example non-transitory machine-readable medium includes a plurality of machine-readable instructions that when executed by one or more processors are adapted to cause the one or more processors to perform a method including: applying an overlay on a target container, the overlay including a set of events corresponding to a first set of modifications to a computer system, and the first set of modifications including changing a first set of internal states of the computer system to a second set of internal states; after applying the overlay, receiving a set of user requests corresponding to a second set of modifications to the computer system, the second set of modifications including changing a third set of internal states of the computer system to a fourth set of internal states; changing, based on the set of user requests, the third set of internal states of the computer system to the fourth set of internal states; and removing the overlay from the target container, while preserving the fourth set of internal states of the computer system.

BRIEF DESCRIPTION OF THE DRAWINGS

The accompanying drawings, which form a part of the specification, illustrate examples and together with the description, further serve to explain the principles of the disclosure. In the drawings, like reference numbers may indicate identical or functionally similar elements. The drawing in which an element first appears is generally indicated by the left-most digit in the corresponding reference number.

DETAILED DESCRIPTION

It is to be understood that the following disclosure provides many different examples for implementing different features of the present disclosure. Some examples may be practiced without some or all of these specific details. Specific examples of components, modules, and arrangements may be described below to simplify the present disclosure. These are, of course, merely examples and are not intended to be limiting.

A platform may enable developers to develop on local containers containing applications and services. A container is an isolated processing space that can exist on top of a virtual machine or on top of actual hardware. A container may offer software that creates virtual environments mimicking a full virtual machine. The container may be viewed as a lightweight virtual machine that is used to create environments and may share the operating system (OS) with the host machine, preserving resources. In an example, each container is missing the main OS kernel. In this example, a call to the kernel may be sent from each container to a single daemon, which runs on a single instance of the host OS on each physical server. A container may allow for the code of an application to be deployed simultaneously with its server configuration as the image may contain both. In some examples, a container along with its server configuration deploys much faster than a full OS image, as they are only a fraction of the size (as small as a few MBs), and they can provide an exact copy of an application (and its configuration) for development or testing.

The platform may integrate into a continuous integration and deployment workflow. For example, developers may write code locally and share their development stack via the platform with colleagues. When the developers are ready, they may push their code and the stack they are developing onto a test environment and execute tests. From the testing environment, images may be pushed into production and the code deployed. The platform may be lightweight and fast, providing a viable, cost-effective alternative to hypervisor-based virtual machines. This is especially useful in high density environments (e.g., building your own cloud or Platform-As-A-Service). The lightweight nature of containers, which run without the extra load of a hypervisor, may result in better use of hardware.

A container is typically lightweight and as small as possible (especially in the production environment). For example, the container may contain dependencies of the application running inside the container, and not much more. Because of its small size, the container may be devoid of troubleshooting and debugging tools for the application. In this example, if the developer desires to debug the application running inside the container (e.g., production container), the developer may use standard OS commands to install troubleshooting or debugging tools. To do so, the developer downloads and installs the appropriate packages each time the developer desires to perform some troubleshooting and/or debugging. It may be desirable to provide a debugging or troubleshooting layer overlaid on the container, and then remove this overlay without affecting other modifications that were made to a computer system coupled to the container.

The present disclose provides techniques to preserve one or more modifications to an internal state of a computer system. Unless specifically stated otherwise, as apparent from the following discussion, it is appreciated that throughout the description, discussions utilizing terms such as "determining," "storing," "applying," "receiving," "sending," "changing," "executing," "identifying," "modifying," "removing," "recording," "generating," "downloading," "creating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

Figure 1:
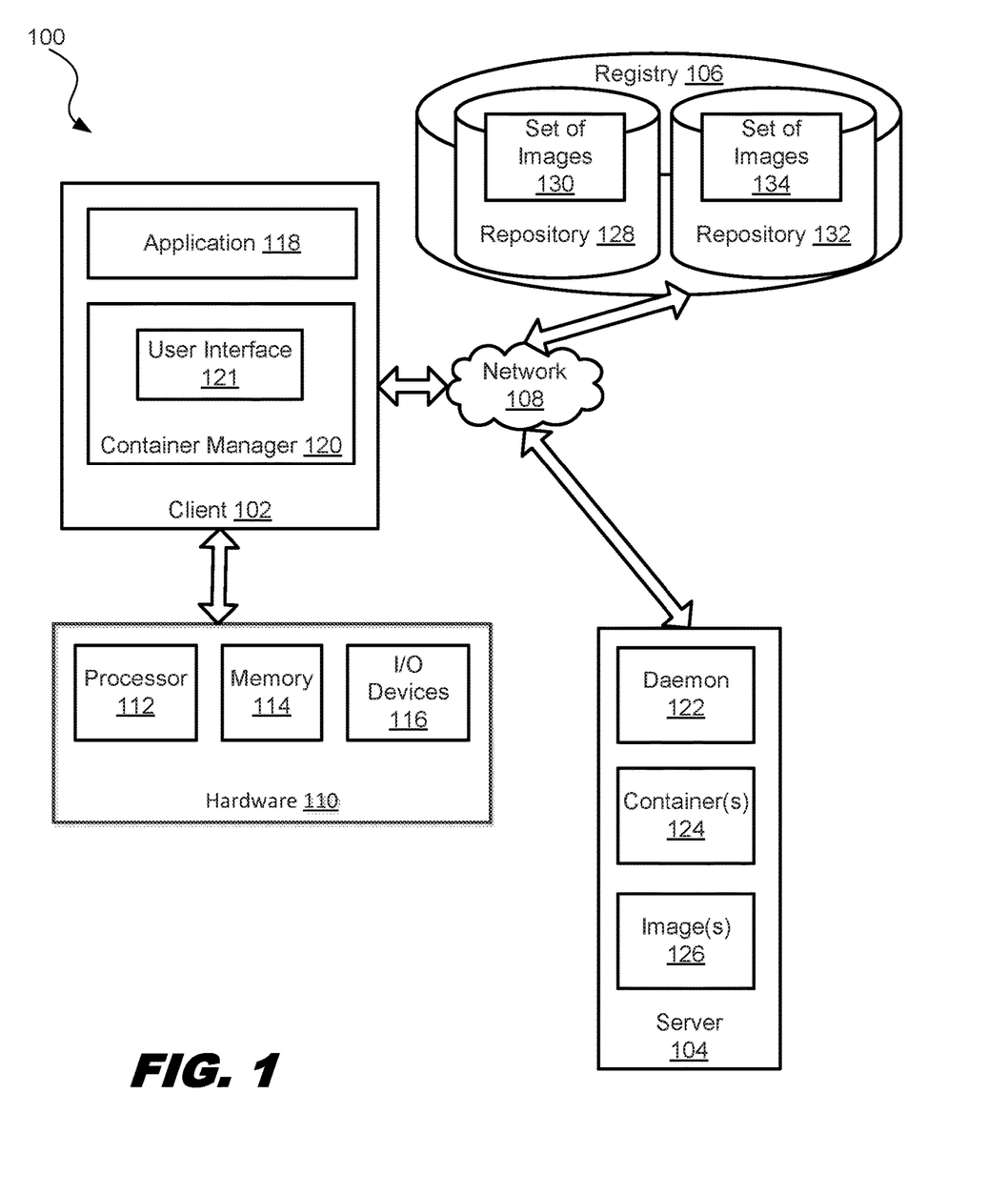
FIG. 1 is a diagram illustrating an example system for preserving one or more modifications to an internal state of a computer system.

FIG. 1 is a diagram illustrating an example system 100 for preserving one or more modifications to an internal state of a computer system. System 100 may be used for automating the creation and distribution of containerized computer program applications and for executing computer program applications using containerization. In an example, system 100 may provide a mechanism to run an application securely isolated in a container. The isolation and security allow developers to run many containers simultaneously on a single host. The lightweight nature of containers, which run without the extra load of a hypervisor, may result in better use of the hardware. Surrounding the container are tooling and a platform that may assist the developer in placing applications (and supporting components) into containers, distributing and shipping those containers to teams for further development and testing, and deploy those applications to the production environment, whether it is in a local data center or the cloud.

System 100 includes a client 102, server 104, and registry 106 coupled over a network 108. Network 108 may be a private network (e.g., local area network (LAN), wide area network (WAN), intranet, etc.), a public network (e.g., the Internet), or a combination thereof. The network may include various configurations and use various protocols including virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, Wi-Fi and Hypertext Transfer Protocol (HTTP), and various combinations of the foregoing.

Client 102 may be coupled to hardware 110 such as processor 112 for executing software (e.g., machine-readable instructions) and using or updating data stored in memory 114. Hardware 110 may include more than one processor 112. A "processor" may also be referred to as a "CPU" or "physical processor" herein. A processor shall refer to a device capable of executing instructions encoding arithmetic, logical, or I/O operations. In an example, a processor may follow the Von Neumann architectural model and may include an arithmetic logic unit (ALU), a control unit, and a plurality of registers. In a further aspect, a processor may be a single-core processor that is typically capable of executing one instruction at a time (or processing a single pipeline of instructions), or a multi-core processor that may simultaneously execute multiple instructions. In another aspect, a processor may be implemented as a single-integrated circuit, two or more integrated circuits, or may be a component of a multi-chip module (e.g., in which individual microprocessor dies are included in a single integrated circuit package and hence share a single socket).

Memory 114 may be one or more of many different types of memory. "Memory" herein shall refer to volatile or non-volatile memory, such as random access memory (RAM), read-only memory (ROM), electrically erasable ROM (EEPROM), or any other memory capable of storing data. Some types of memory, such as solid state drives typically have relatively larger storage volume but relatively slower performance. Other types of memory, such as those used for RAM, are optimized for speed and may be referred to as "working memory." The various types of memory may store information in the form of software and data. The software may include an operating system, a hypervisor 108, and various other software applications. Hardware 110 may include other I/O devices 116.

Client 102 includes an application 118 and a container manager 120. Container manager 120 may run one or more applications 118 inside a container by communicating with server 104. A developer may develop on one or more containers 124 that contain particular applications and services, and then integrate into a continuous integration and deployment workflow. The developer may write software code locally and share her development stack via the platform with her colleagues. When ready, developers may push their software code and the stack they are developing onto a test environment and execute tests. From the testing environment, the developers then push the images into production and deploy code. Containers may run on a developer's local host, on physical or virtual machines in a data center, or in the cloud.

Server 104 includes a daemon 122, one or more containers 124, and one or more images 126. Container manager 120 may communicate with daemon 122, which may perform the heavy lifting of building, running, and distributing one or more containers 124. In an example, container manager 120 and daemon 122 run on the same system. In another example, container manager 120 is coupled to a remote daemon 122 and they communicate via sockets or through a RESTful API. Daemon 122 may run on a host machine. The user may interact with a user interface 121 to request container manager 120 to perform an action. For example, user interface 121 may accept commands from the user and communicate back and forth with daemon 122 to build a container or perform other actions.

In FIG. 1, container 124 is a runtime instance of image 126. In an example, container 124 includes an image 126, an execution environment, and a standard set of instructions. An image is the basis of containers and is used to create one or more containers. In an example, image 126 is an ordered collection of root file system modifications and the corresponding execution parameters for use within a container runtime. Image 126 may include a union of layered file systems stacked on top of each other. Image 126 is stateless (does not have state). In some examples, image 126 is not modifiable and thus does not change. Image 126 may be a read-only template. In an example, image 126 contains an UBUNTU® OS with APACHE® and the web application installed.

A registry 106 may be a hosted service containing repositories of images which responds to a registry application programming interface (API). Registry 106 includes a repository 128 that stores set of images 130 and a repository 132 that stores a set of images 134. A repository may be shared by pushing it to server 104. The different images in the repository may be labeled using tags and may be binaries that are used as templates for one or more applications. In an example, repository 128 is a public repository and repository 132 is a private repository from which images may be downloaded or to which images may be uploaded. Container manager 120, server 104, and registry 106 may provide a mechanism to build new images, update existing images, or download existing images. In an example, container manager 120, server 104, and registry 106 are part of the DOCKER® platform. In this example, container 124 is a DOCKER® container, image 126 is a DOCKER® image, and registry 106 is a DOCKER® registry. Trademarks are the properties of their respective owners. The DOCKER® container may be a production container, which may include dependencies of application 118 that are run in the container.

An image may be created hierarchically. In an example, each change is tracked as a result compared to the original image. It may be desirable to create one or more overlays to an image chain. For example, rather than building on top of an existing image, an overlay may start from a "null" state, and any modifications are recorded as such. Any such overlay may be applied to an already running container regardless of the previous state or version of the container.

The present disclosure provides techniques to preserve an internal state of a computer system. The computer system may include a file system of the target container. In an example, an internal state of the file system is preserved. An image is typically lightweight, and thus only a few tools may be present in the image. Accordingly, the container created from the image will typically also be lightweight. To keep containers lightweight, containers typically do not include troubleshooting or debugging tools, which are typically heavy and consume a large amount of memory. The lack of troubleshooting and debugging tools may be problematic if a production container that derives from a production image is running and an issue arises. To solve this problem, a user may copy out log files or simulate an environment outside of the container. This solution, however, may be time consuming and consume a large amount of memory. It may be desirable to provide a debugging image on top of the production image and merge the production and debugging images such that the container includes both the production and debugging images. In an example, the debugging image may be included in an overlay that is applied to the container and removed at a later point in time. Removal of an overlay from a container includes removing the modifications that were made to the computer system based on applying the overlay to the container.

An overlay applied to a container adds additional functionality to the container and may be removed later. Although the overlay may be described as adding debugging or troubleshooting functionality to the container, this is not intended to be limiting and it should be understood that the overlay may add other functionality to the container to perform additional tasks. An overlay may be provided on demand during runtime while the container is running. An overlay may be generated from a computer system and applied to the same or different computer system(s). An overlay may be referred to as "on a container" if the overlay has been applied on the container and not yet removed from the container. While the overlay is on the container, the user may perform actions that she desires to be preserved, even after the overlay is removed from the container. In some examples, it may be desirable to preserve an internal state of a computer system, where the preserved internal state is a change in state that occurred after the overlay was applied. "After the overlay was applied" on a target container may refer to replaying the events recorded in the overlay on the target container.

Figure 2:
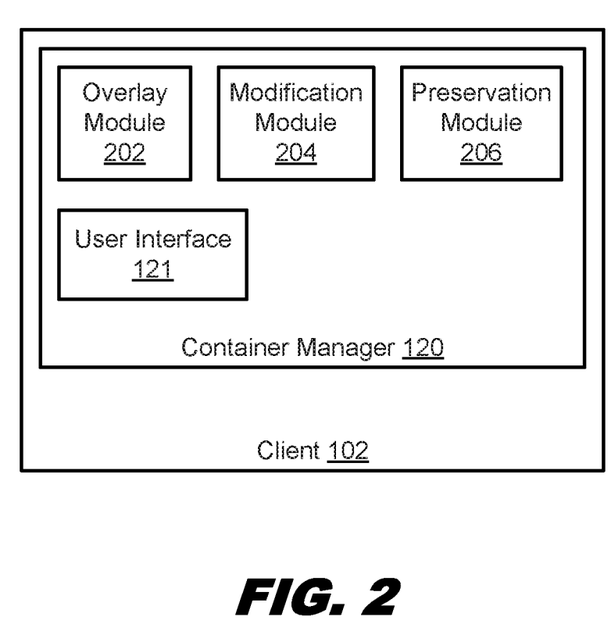
FIG. 2 is a block diagram illustrating an example client that preserves one or more modifications to an internal state of a computer system.

FIG. 2 is a block diagram 200 illustrating an example client 102 that preserves one or more modifications to an internal state of a computer system. In FIG. 2, client 102 includes container manager 120, which includes a user interface 121, overlay module 202, modification module 204, and preservation module 206. User interface 121 may receive a user request to record one or more events corresponding to one or more modifications to one or more internal states of a computer system. An overlay module 202 may record, based on the user request, one or more events based on one or more user interface interactions with the computer system. The one or more recorded events may correspond to a first set of modifications that cause a first set of internal states of the computer system to be changed to a second set of internal states. Overlay module 202 may generate the overlay based on the one or more recorded events. In an example, overlay module 202 stores the overlay into a data repository to be used at a later point in time.

Overlays stored in the data repository may be applied to multiple containers, not just the container that was used in generating the overlay. In an example, container 124 may be running, and the user may provide a user request to record one or more events corresponding to one or more modifications to one or more internal states of a computer system. In an example, the computer system includes a file system of container 124. In this example, the first set of modifications may include one or more modifications to the file system of container 124. The user may interact with container 124 and request actions to be performed that modify the computer system. An example modification to the file system may include creating a file in the file system, deleting a file from the file system, modifying a file in the file system, copying a file stored in the file system, and storing a file into the file system. The overlay that is generated based on container 124 may be applied on container 124 or one or more other containers.

Overlay module 202 may download the overlay from the data repository and apply the overlay on a target container. The overlay may be stored in a file (e.g., binary file or a text file) that is read by overlay module 202. Overlay module 202 may read the file storing the overlay and accordingly read the one or more events based on the one or more user interface interactions with the computer system. Overlay module 202 may retrieve the overlay during runtime of the target container and apply the over on the target container while it is running. Applying the overlay to a target container includes replaying the one or more recorded events stored in the overlay on the target container. In an example, the overlay includes a set of events corresponding to a first set of modifications to a computer system. The first set of modifications may include changing a first set of internal states of the computer system to a second set of internal states. In an example, the computer system includes a file system of the target container. In this example, the first set of modifications may include one or more modifications to the file system of the target container. The modification to the computer system may be the creation of a file in the file system of the target container, deletion of a file from the file system of the target container, modification of a file in the file system of the target container, copying of a file stored in the file system of the target container, and storing a file into the file system of the target container. In an example, the file is a debugging or troubleshooting tool for debugging or trouble shooting the application running in the target container.

After the overlay is applied to the target container and while the overlay is on the target container, user interface 121 may receive a set of user requests corresponding to a second set of modifications to the computer system. In an example, the overlay may include actions that help in debugging target container. In this way, it may be unnecessary for the target container to include, for example, debugging images because they may be applied to the target container at a later point in time. The second set of modifications may include changing a third set of internal states of the computer system to a fourth set of internal states. The third set of internal states is based on the second set of internal states. In an example, the third set of internal states is the same as the second set of internal states. In another example, the second set of internal states of the computer system occurred before the third set of internal states of the computer system. In this example, the third set of internal states may change one or more internal states of the second set of internal states.

Modification module 204 may modify, based on the set of user requests, the third set of internal states of the computer system to the fourth set of internal states. Accordingly, container manager 120 may allow the user to interact with the container and modify the state of the computer system, while the overlay is on the container. For example, modification module 204 may change the third set of internal states of the computer system to the fourth set of internal states of the computer system, while the overlay is installed on the target container.

User interface 121 may receive a request to remove the overlay from the target container. In response to the request to remove the overlay, preservation module 206 may remove the overlay from the target container, while preserving the fourth set of internal states of the computer system. In this example, preservation module 206 preserves the modifications made by the user after the overlay was applied to the target container, but removes the modifications to the computer system made by the overlay. In an example, preservation module 206 removes the overlay from the target container by rolling back the second set of internal states, which resulted from applying the overlay on the target container.

In some examples, the computer system that is modified by the overlay and by the user request(s) includes a hard drive. Preservation module 206 may track the modifications made to the computer system. In an example, preservation module 206 preserves the modifications made by the user while the overlay is on the target container (e.g., preserves the fourth set of internal states of the computer system) by creating a first snapshot of the hard drive before applying the overlay, creating a second snapshot of the hard drive after applying the overlay, and creating a third snapshot of the hard drive after modifying the third set of internal states of the computer system to the fourth set of internal states. The first snapshot may include the first set of internal states of the computer system before the overlay is applied to the target container. The second snapshot may include the second set of internal states of the computer system, where application of the overlay caused the first set of internal states of the computer system to change to the second set of internal states. The third snapshot may include the fourth set of internal states of the computer system, where application of the user's modification requests to the computer system caused the third set of internal states of the computer system to change to the fourth set of internal states. Preservation module 206 may determine a difference between the first, second, and third snapshots. Preservation module 206 may remove the overlay by preserving the set of internal states included in the third snapshot and rolling back the modifications introduced in the second snapshot compared to the first snapshot.

Figure 3:
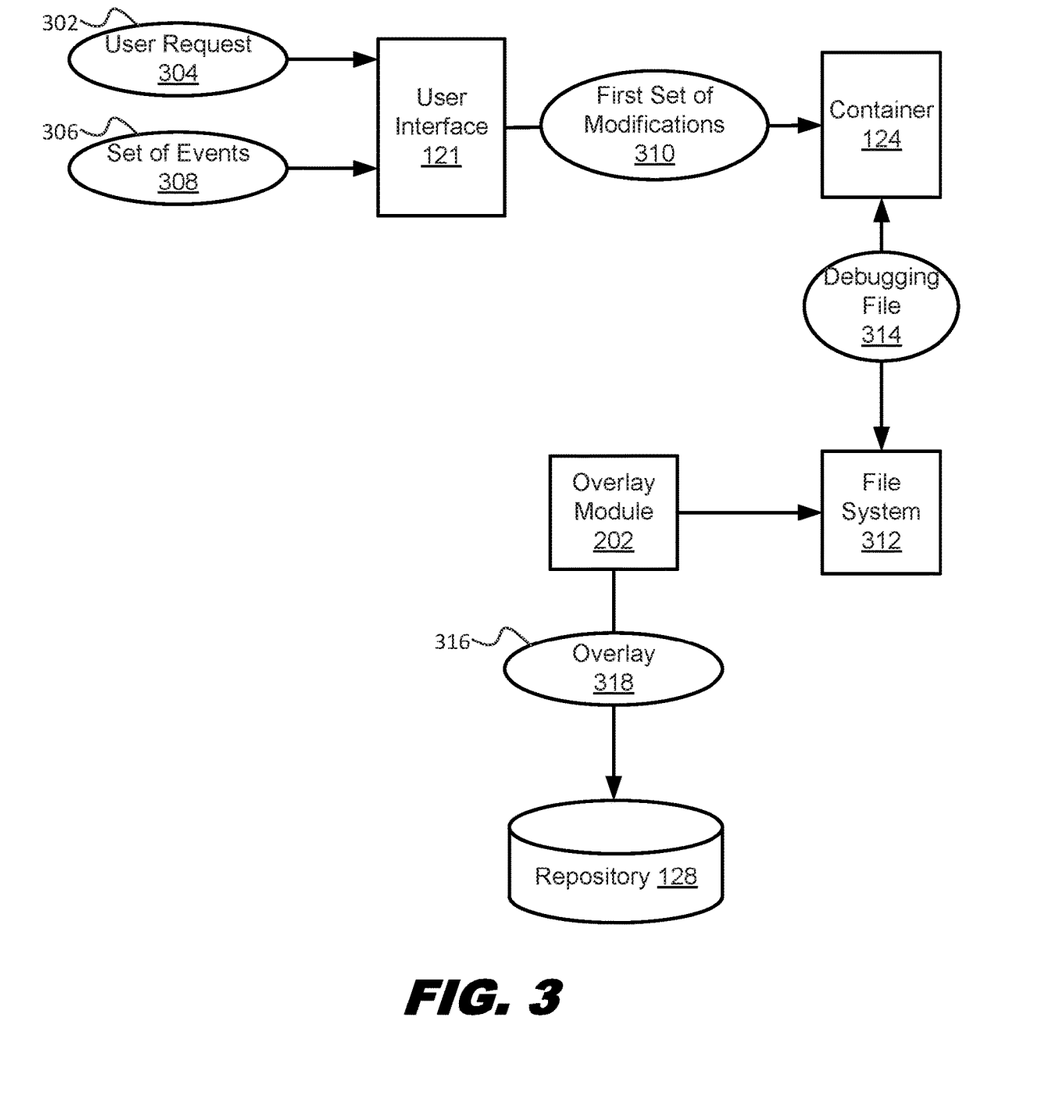
FIG. 3 is an example process flow for generating one or more overlays.

FIG. 3 is an example process flow 300 for generating one or more overlays. In FIG. 3, at an action 302, user interface 121 receives a user request 304. User request 304 is a request to record one or more events corresponding to one or more modifications to one or more internal states of a computer system. In an example, the computer system is a file system 312 of container 124. After receiving user request 304, container manager 120 may be in a recording mode, in which overlay module 202 records, based on user request 304, one or more events based on one or more user interface interactions with the computer system.

The user may interact with a running container 124 via user interface 121 and perform actions that are recorded and eventually included in an overlay. At an action 308, user interface 121 receives a set of events 308 corresponding to a first set of modifications 310 to container 124. First set of modifications 310 includes changing a first set of internal states of file system 312 to a second set of internal states. In an example, a modification of first set of modifications 310 includes a modification to file system 312 of container 124. In an example, set of events 308 includes events that allow users to debug or troubleshoot an application running in container 124. For example, set of events 308 may include the installation of a debugger tool into file system 312. A debugging file 314 may store the debugging tool, which may be installed on file system 312 by an event of set of events 308.

At an action 316, overlay module 202 generates an overlay 318 by recording the particular events into the overlay, where one or more events includes changes to file system 312 of container 124. Overlay 318 includes set of events 308 corresponding to first set of modifications 310 to the computer system. In an example, overlay module 202 records events as they are requested by the user via user interface 121. In another example, the user provides a configuration file that contains batch processes that generate an overlay from base images. User interface 121 may receive a request from the user to cease recording the events. In response to the request to cease recording the events, overlay module 202 may stop recording events that modify the computer system (e.g., file system 312). After receiving the request to cease recording the events, container manager 120 may be in a non-recording mode, in which overlay module 202 does not record any more events.

Overlay module 202 may store one or more overlays into a data repository such as repository 128. Although one overlay is illustrated as being generated, it should be understood that a plurality of overlays may be generated. An overlay may be generated based on a set of events corresponding to a modification to container 124 or another container 124. User interface 121 may receive a user request to apply overlay 318 on one or more target containers.

Figure 4:
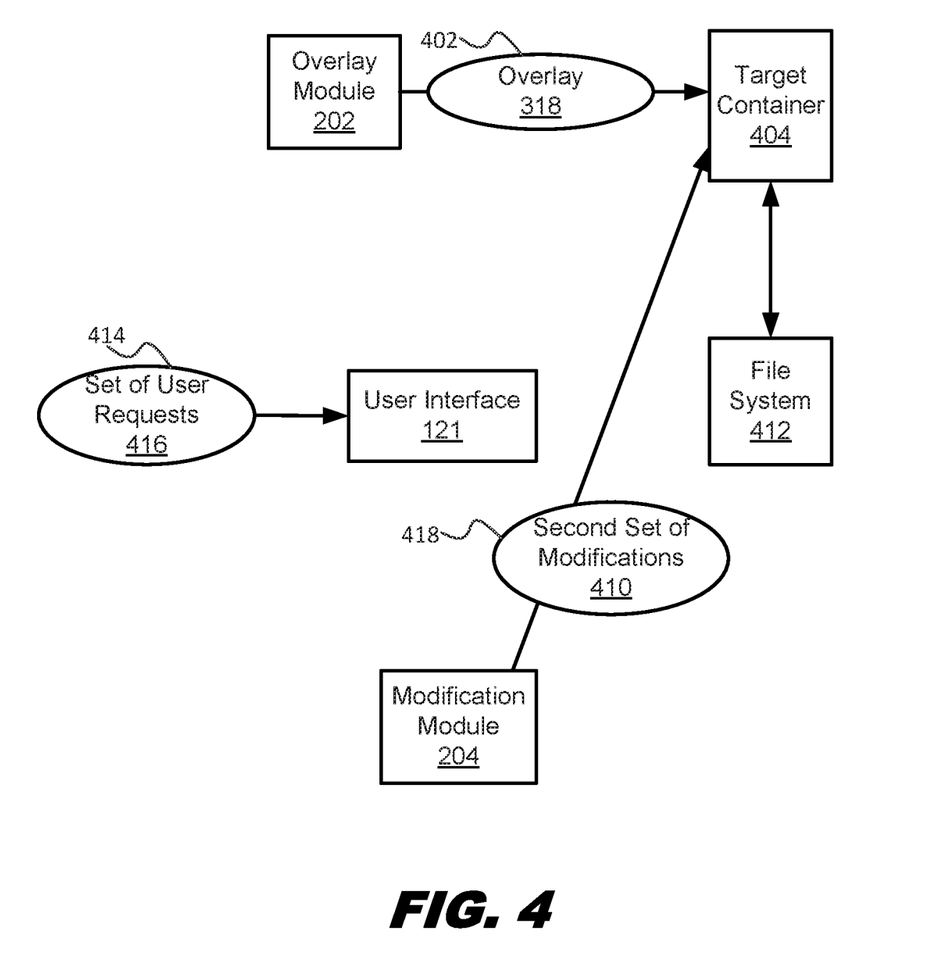
FIG. 4 is an example process flow for preserving one or more modifications to an internal state of a computer system.

FIG. 4 is an example process flow 400 for preserving one or more modifications to an internal state of a computer system. In FIG. 4, at an action 402, overlay module 202 applies overlay 318 on target container 404, wherein overlay 318 includes set of events 308 corresponding to first set of modifications 310 to file system 312. Target container 404 may be the same as or different from container 124. Overlay module 202 applies overlay 318 on target container 404 by executing set of events 308 corresponding to first set of modifications 310 on file system 312. For example, applying overlay 318 on target container 404 may include executing set of events 308 on the target container. Accordingly, the modifications that were made to file system 312 may also be made to file system 412 by applying overlay 318 on target container 404.

Overlay 318 may provide the OS on the host machine storing target container 404 some additional tools (e.g., debugging tool). The overlay may be used as an additional layer on top of the set of images from which the target container is derived. In an example, the overlay provides debugging capabilities and thus provides a debugging layer on top of the images from which a target container is derived. In an example, container manager 120 may take a snapshot of the image file system and the overlay is applied to a target container, introducing additional commits on the image. A user may continue to work with the target container, which may result in more changes to the computer system (e.g., file system 412).

At an action 414, user interface 121 receives a set of user requests 416 corresponding to second set of modifications 410 to target container 404 after overlay 318 is applied to the target container. Second set of modifications 410 includes changing a third set of internal states of file system 412 to a fourth set of internal states. In an example, second set of modifications 410 modifies a file system 412 of target container 404. In an example, set of user requests 416 may include events that modify file system 412. Preservation module 206 may remove the overlay from the target container, while preserving second set of modifications 410 to file system 412.

At an action 418, modification module 204 changes, based on set of user requests 416, the third set of internal states of file system 412 to the fourth set of internal states. Preservation module 206 may then remove overlay 318 from target container 404, while preserving the fourth set of internal states of file system 412. Preservation module 206 removes overlay 318 and keeps the changes to file system 412 that were made in response to set of user requests 416, but not the changes to file system 412 that were made in response to applying overlay 318 on target container 404. In some examples, preservation module 206 may rollback the computer system (e.g., file system 412) to a previous snapshot, which was taken before overlay 318 was applied. Doing so may remove all modifications to file system 412 made based on overlay 318 and set of user requests 416.

Additionally, preservation module 206 has the ability to remove just overlay 318, while preserving the changes introduced by the user (e.g., via set of user requests 416) while overlay 318 was on target container 404. In an example, container manager 120 creates a tag (e.g., a snapshot) of the image file system before the overlay is applied on the target container. In this example, preservation module 206 may revert the state of file system 412 back to the tag created before. Preservation module 206 may replay all the commits skipping those introduced by the overlay. In this way, preservation module 206 may preserve the modifications based on the user's commands (e.g., second set of modifications 410) without the overlay in the image. In another example, preservation module 206 may protect all files introduced by the overlay from writes. In another example, preservation module 206 may declare that changes introduced by the overlay from writes will be discarded. In this example, preservation module 206 may discard those changes made based on applying the overlay to the target container.

In an example, the overlay includes debugging tools and utilities. A developer may enrich the running container with the overlay, perform an inspection and bug hunting, and fix any errors. After fixing the errors, the overlay may be removed and the container may be returned into the production state.

As discussed above and further emphasized here, FIGS. 1-4 are merely examples, which should not unduly limit the scope of the claims.

Figure 5:
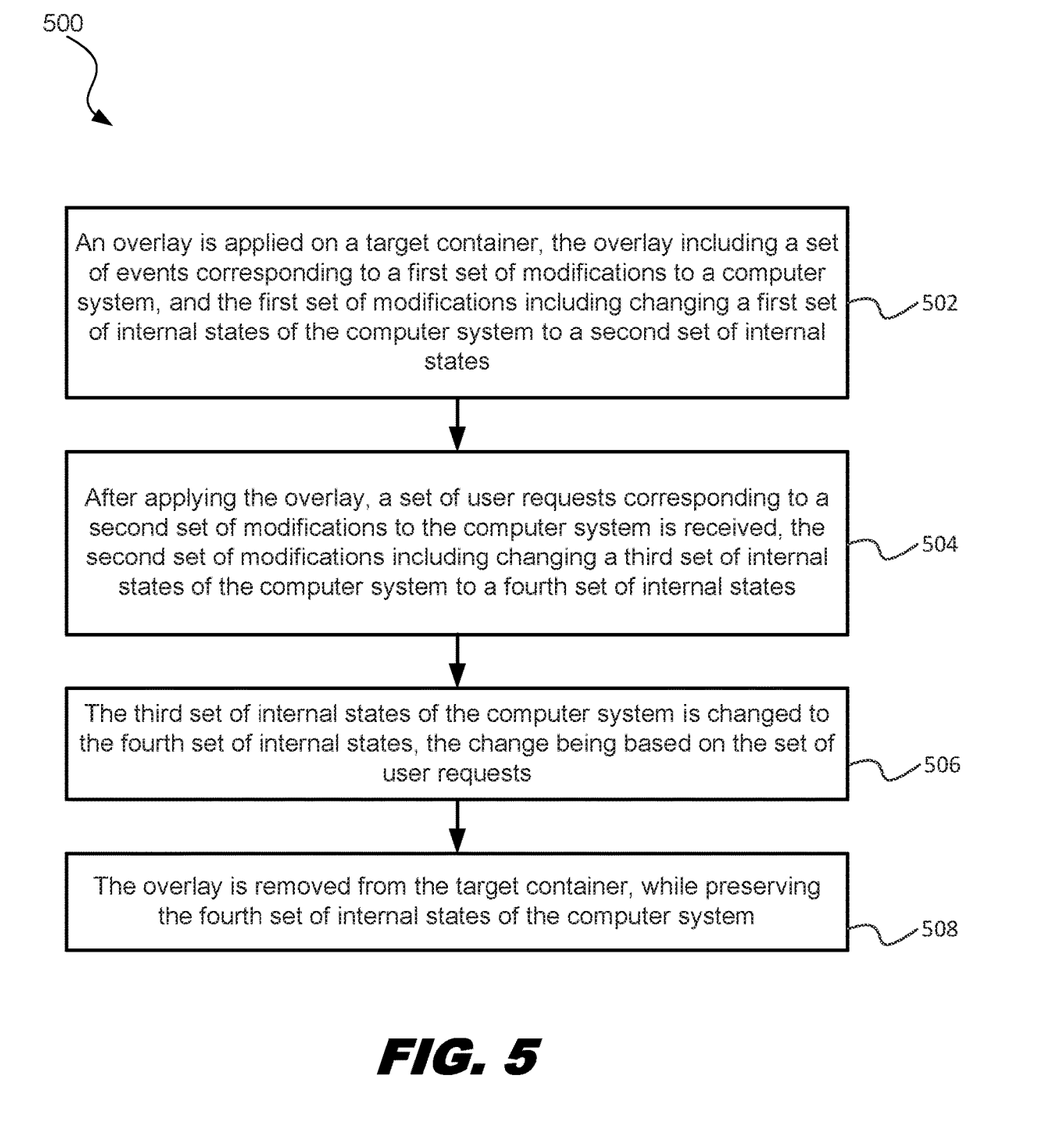
FIG. 5 is a flowchart illustrating an example method of preserving one or more modifications to an internal state of a computer system.

FIG. 5 is a flowchart illustrating an example method 500 of preserving one or more modifications to an internal state of a computer system. Method 500 is not meant to be limiting and may be used in other applications. Method 500 may be performed by processing logic that may include hardware (e.g., circuitry, dedicated logic, programmable logic and microcode), software (such as instructions run on a computer system, specialized hardware, dedicated machine, or processing device), firmware, or a combination thereof. In some examples, method 500 is performed by system 100 illustrated in FIG. 1. For example, blocks of method 500 may be performed on client 102 and/or server 104. In some examples, the order of the actions described below may also be performed according to alternative orderings. In yet other examples, additional actions may be added and actions that are described may be removed.

Method 500 includes blocks 502, 504, 506, and 508. In a block 502, an overlay is applied on a target container, the overlay including a set of events corresponding to a first set of modifications to a computer system, and the first set of modifications including changing a first set of internal states of the computer system to a second set of internal states. A change from a first internal state to a second internal state may be any change that modifies the computer system (e.g., file system 312). For example, the change may include a creation of a file, the modification of a value stored in the computer system, etc. In an example, overlay module 202 applies overlay 318 on target container 404, overlay 318 including set of events 308 corresponding to first set of modifications 310 to file system 312 of container 124, and first set of modifications 310 including changing a first set of internal states of file system 312 to a second set of internal states.

In a block 504, after applying the overlay, a set of user requests corresponding to a second set of modifications to the computer system is received, the second set of modifications including changing a third set of internal states of the computer system to a fourth set of internal states. In an example, after applying the overlay, user interface 121 receives set of user requests 416 corresponding to second set of modifications 410 to file system 412 of target container 404, second set of modifications 410 including changing a third set of internal states of file system 412 to a fourth set of internal states.

In a block 506, the third set of internal states of the computer system is changed to the fourth set of internal states, the change being based on the set of user requests. In an example, modification module 204 changes, based on set of user requests 416, the third set of internal states of file system 412 to the fourth set of internal states. In block 508, the overlay is removed from the target container, while preserving the fourth set of internal states of the computer system. In an example, preservation module 206 removes overlay 318 from target container 404, while preserving the fourth set of internal states of file system 412.

It is also understood that additional processes may be performed before, during, or after blocks 502-508 discussed above.

Figure 6:
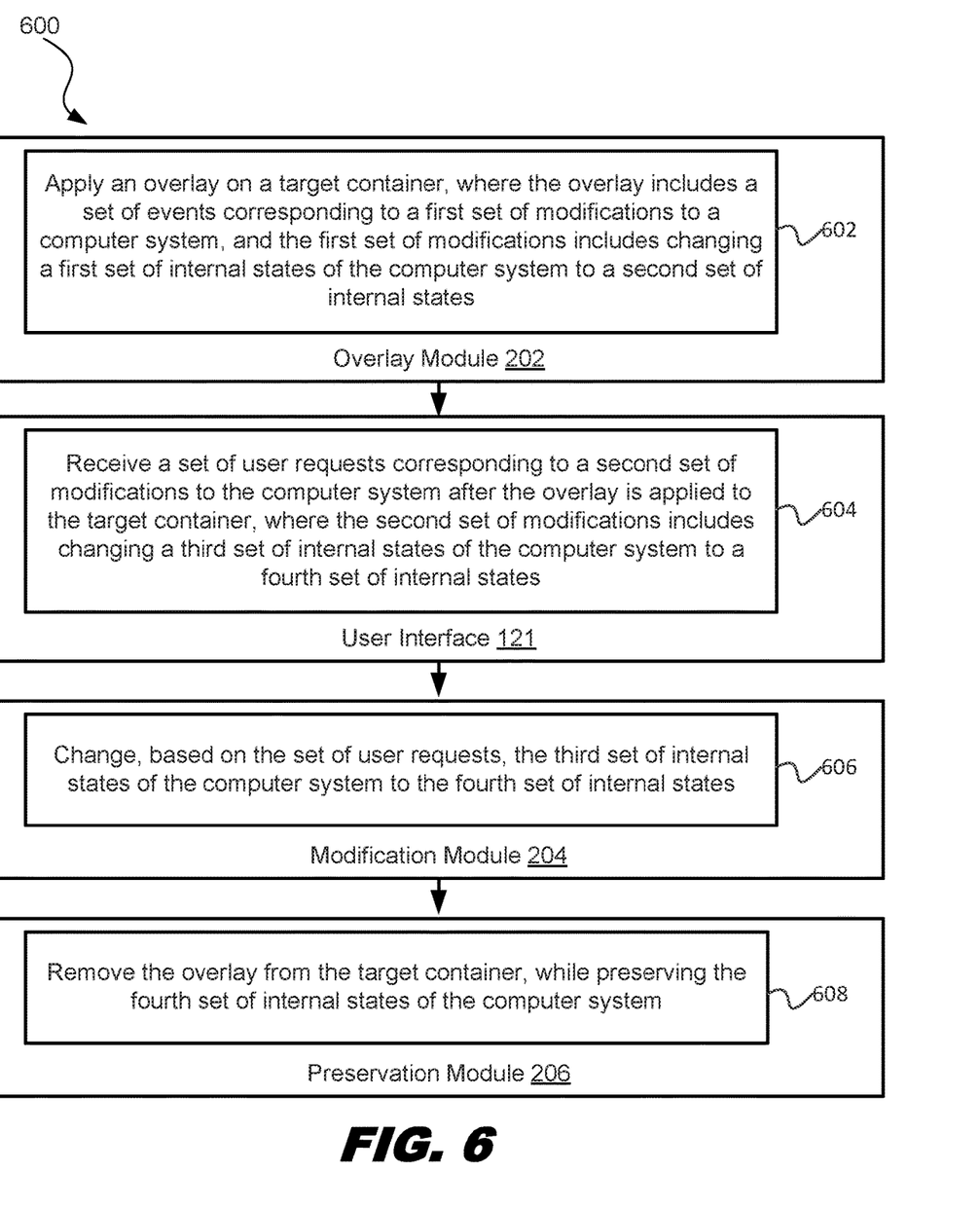
FIG. 6 is another flowchart illustrating a method of preserving one or more modifications to an internal state of a computer system.

FIG. 6 is another flowchart illustrating a method 600 of preserving one or more modifications to an internal state of a computer system. Method 600 is not meant to be limiting and may be used in other applications. Method 600 may be performed by processing logic that may include hardware (e.g., circuitry, dedicated logic, programmable logic and microcode), software (such as instructions run on a computer system, specialized hardware, dedicated machine, or processing device), firmware, or a combination thereof. In some examples, method 600 is performed by system 100 illustrated in FIG. 1. For example, blocks of method 600 may be performed on client 102 and/or server 104. In some examples, the order of the actions described below may also be performed according to alternative orderings. In yet other examples, additional actions may be added and actions that are described may be removed.

Method 600 includes blocks 602, 604, 606, and 608. In a block 602, overlay module 202 applies an overlay on a target container, where the overlay includes a set of events corresponding to a first set of modifications to a computer system, and the first set of modifications includes changing a first set of internal states of the computer system to a second set of internal states. In a block 604, user interface 121 receives a set of user requests corresponding to a second set of modifications to the computer system after the overlay is applied to the target container, where the second set of modifications includes changing a third set of internal states of the computer system to a fourth set of internal states. In a block 606, modification module 204 changes, based on the set of user requests, the third set of internal states of the computer system to the fourth set of internal states. In a block 608, preservation module 206 removes the overlay from the target container, while preserving the fourth set of internal states of the computer system.

In various implementations, client 102 may be a client computing device and server 104 may be a server computing device. The client or server computing device may include one or more processors 104. The client or server computing device may additionally include one or more storage devices each selected from a group including floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

The computing device (e.g., client 102 or server 104) may include a bus or other communication mechanism for communicating information data, signals, and information between various components of computer system. The components may include an input/output (I/O) component that processes a user action, such as selecting keys from a keypad/keyboard, selecting one or more buttons or links, etc., and sends a corresponding signal to the bus. The I/O component may also include an output component such as a display, and an input control such as a cursor control (such as a keyboard, keypad, mouse, etc.). An audio I/O component may also be included to allow a user to use voice for inputting information by converting audio signals into information signals. Audio I/O component may allow the user to hear audio.

A transceiver or network interface may transmit and receive signals between the client or server computing device and other devices via a communications link to a network. In an example, the transmission is wireless, although other transmission mediums and methods may also be suitable. Processor 112, which may be a micro-controller, digital signal processor (DSP), or other processing component, processes these various signals, such as for display on the client device or transmission to other devices via the communications link. Processor 112 may also control transmission of information, such as cookies or IP addresses, to other devices.

Components of the client or server computing device may also include a system memory component (e.g., RAM), a static storage component (e.g., ROM), and/or a disk drive.

Client 102 or server 104 performs specific operations by processor 112 and other components by executing one or more sequences of instructions contained in the system memory component (e.g., memory 114). Logic may be encoded in a computer readable medium, which may refer to any medium that participates in providing instructions to processor 112 for execution. Such a medium may take many forms, including but not limited to, non-volatile media, volatile media, and transmission media. In various implementations, non-volatile media includes optical, or magnetic disks, or solid-state drives, volatile media includes dynamic memory, such as the system memory component, and transmission media includes coaxial cables, copper wire, and fiber optics, including wires that include the bus. In an example, the logic is encoded in a non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In some examples, execution of instruction sequences (e.g., method 500 or 600) to practice the present disclosure may be performed by host machine 102. In various other examples of the present disclosure, a plurality of host machines coupled by the communications link to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various examples provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate examples and/or modifications to the present disclosure, whether explicitly described or implied herein, are possible in light of the disclosure. Changes may be made in form and detail without departing from the scope of the present disclosure. Thus, the present disclosure is limited only by the claims.

We claim:

1. A method of preserving an internal state of a computer system, comprising:
    generating an overlay from a null state by including a plurality of events into the overlay;
    executing the plurality of events included in the overlay on a target container, wherein execution of the plurality of events causes a first internal state of a computer system associated with the target container to be modified;
    after executing the plurality of events on the target container, modifying a second internal state of the computer system; and
    removing the overlay from the target container, while preserving the modified second internal state of the computer system.

2. The method of claim 1, comprising:
    receiving a first user request to record events corresponding to modifications to one or more internal states of the computer system; and
    recording, based on the first user request, the events corresponding to modifications to the one or more internal states of the computer system.

3. The method of claim 2, comprising:
    receiving a second user request to cease recording the events corresponding to the modifications to the one or more internal states; and
    cease recording the events based on the second user request, wherein the events that are recorded include the plurality of events.

4. The method of claim 1, wherein the plurality of events is based on user interface interactions with the computer system.

5. The method of claim 1, wherein the computer system includes a file system of the target container, and modification of the first internal state includes one or more modifications to the file system.

6. The method of claim 5, wherein the plurality of events includes an installation of a debugger tool into the file system.

7. The method of claim 1, wherein the plurality of events includes a debug event for debugging an application running in the target container.

8. The method of claim 1, comprising:
    storing the overlay into a data repository.

9. The method of claim 8, comprising:
    downloading the overlay from the data repository;
    applying the overlay on a second target container;
    after applying the overlay on the second target container, modifying a third internal state of a file system of the second target container; and
    removing the overlay from the second target container, while preserving the modified third internal state of the file system of the second target container.

10. The method of claim 1, wherein executing the plurality of events includes executing the plurality of events on a running container.

11. The method of claim 1, comprising:
    merging a production image and a first image into the target container, the first image including the plurality of events.

12. The method of claim 1, wherein the second internal state is based on the first internal state.

13. A system for preserving an internal state of a computer system, comprising:
- a memory storing a first internal state of a computer system;
- an overlay module that generates an overlay from a null state by including a plurality of events into the overlay and executes the plurality of events on a target container, wherein execution of the plurality of events causes the first internal state of the computer system associated with the target container to be modified;
- a modification module that modifies a second internal state of the computer system after the overlay module executes the plurality of events on the target container; and
- a preservation module that removes the overlay from the target container, while preserving the modified second internal state of the computer system.

14. The system of claim 13, wherein the second internal state is based on the first internal state.

15. The system of claim 13, wherein the computer system includes a file system of the target container, and modification of the first internal state includes one or more modifications to the file system.

16. The system of claim 15, wherein the plurality of events includes an installation of a debugger tool into the file system.

17. The system of claim 13, wherein the plurality of events includes a debug event for debugging an application running in the target container.

18. The system of claim 13, wherein before the preservation module removes the overlay from the target container, the target container includes a first image and a production image, wherein the first image includes the plurality of events.

19. The system of claim 18, wherein after the preservation module removes the overlay from the target container, the target container does not include the first image.

20. A non-transitory machine-readable medium comprising a plurality of machine-readable instructions that when executed by one or more processors is adapted to cause the one or more processors to perform a method comprising:
- generating an overlay from a null state by including a plurality of events into the overlay;
- executing the plurality of events included in the overlay on a target container, wherein execution of the plurality of events causes a first internal state of a computer system associated with the target container to be modified;
- after executing the plurality of events on the target container, modifying a second internal state of the computer system; and
- removing the overlay from the target container, while preserving the modified second internal state of the computer system.

* * * * *